United States Patent

Hsia

[15] 3,640,861
[45] Feb. 8, 1972

[54] PROCESS OF MAKING TONER
[72] Inventor: Shwang Hsia, New City, N.Y.
[73] Assignee: Frye Industries Inc., New York, N.Y.
[22] Filed: Nov. 26, 1969
[21] Appl. No.: 880,374

[52] U.S. Cl. ............................252/62.1, 260/41 R, 264/140
[51] Int. Cl. ...........................................................G03g 9/24
[58] Field of Search.........................260/41, 41 C; 252/62.1; 264/140

[56] References Cited

UNITED STATES PATENTS

| | | | |
|---|---|---|---|
| 3,488,299 | 1/1970 | Sato | 260/41 |
| 3,428,579 | 2/1969 | Stahnecker et al. | 260/41 |
| 3,349,703 | 10/1967 | Varron | 252/62.1 |
| 2,530,852 | 11/1950 | Bixby | 260/34.2 |

*Primary Examiner*—George F. Lesmes
*Assistant Examiner*—J. P. Brammer
*Attorney*—John A. Crowley, Jr. and Francis J. Mulligan, Jr.

[57] ABSTRACT

A process for producing solid electrostatic toner wherein pigment is milled into a molten resin while the resin contains a gas dispersed therethrough, cooling the resin to form a friable solid and comminuting said solid to toner particle size.

5 Claims, No Drawings

PROCESS OF MAKING TONER

The present invention is concerned with solid toners employable for the development of electrostatic images and, more particularly, with an improved process for the manufacture of said solid toners.

Those skilled in the arts of electrostatic copying and printing understand that invisible, electrostatic images are developed by means of toners, solid or liquid. Solid toner, the manufacture of which is the subject of the present application, usually consists of a multiplicity of fine, pigmented, resinous particles which are adapted to be fixed on a substrate by exposure to heat or tackifying solvent vapor. The toner particles advantageously have an average particle dimension of about 10 to 15 microns and usually, although not always, comprise a matrix of thermoplastic resin with pigment particles dispersed therethrough. It is known to produce toner by melting thermoplastic resin, grinding or stirring pigment through said molten resin to provide a good dispersion of pigment in the resin, cooling to solidify the pigmented resin and grinding the pigmented resin to the required toner particle size. The present invention contemplates an improvement in this process.

It is an object of the present invention to provide a novel process for the production of solid, electrostatic toners.

Another object of the invention is to provide a novel process for the production of particulate, pigmented thermoplastic toners.

Other objects and advantages will become apparent from the following description.

Generally speaking, the present invention contemplates a process for the production of solid, electrostatic toners which comprises (1) causing a gaseous dispersion to exist in a molten (or at least highly plastic) thermoplastic resinous mass, (2) introducing and dispersing pigment into the molten resin containing gas in dispersion under high-shear conditions, (3) causing the thus pigmented resin containing the gaseous dispersion to cool and solidify, and (4) optionally, thereafter, grinding the thus produced, highly friable, solidified, pigmented resin to a powder, the bulk of which has an average particle size of about 10 to 15 microns. The advantages accrued by use of this process are essentially first that better pigment dispersions are produced with consequent improved pigmentation characteristics and secondly the cooled pigmented resin is highly firable and thus is in an ideal state for chipping or otherwise breaking into fragments and subsequent comminution to micron sizes in conventional air-attrition apparatuses for use as solid electrostatic toner. If the end product is a concentrate which is to be used as a means of incorporating pigment into plastic masses, the product can be produced as chips or other relatively small masses.

The resin in which the gaseous dispersion or foam is caused to exist is usually a resin having a softening point (ball and ring method) of about 118°–123° C. Such a resin is advantageously in recognizable liquid or highly plastic form at a temperature within the range of 100° C. to 130° C. at which temperature the pigment is sheared into the foamed mass. Within limits set by the chemical stability of the resin and the viscosity requirements of the shearing device, higher resin temperatures can be used. However, care should be taken to avoid any temperatures which would tend to detrimentally affect those characteristics of the resin important for the intended purpose. Provision may very well have to be made for cooling of the shear inducing means (e.g., a two-roll mill or a high-shear mixer), for example, by water jacketing or otherwise, so as to avoid danger of overheating.

Thermoplastic resins useful in the manufacturing process of the present invention include polystyrene, styrene copolymerized with up to about 25 or even 40 percent of one or more of acrylic or alkyl acrylic esters, e.g., butyl acrylate, ethyl methacrylate and butyl methacrylate, acrylonitrile and the like, mixtures of polystyrene and one or more of polymerized styrene copolymers, polyacrylic esters, polyalkylacrylic esters or the like, styrene, butadiene, and acrylonitrile terpolymers mixed with polystyrene and the like. It is to be noted for purposes of this invention that the term "thermoplastic resin" is used in a broad sense inclusive, not only of art recognized thermoplastic resinous materials but also those thermosetting materials which can be heated and reheated to a highly plastic condition at some temperature below that temperature at which irreversible thermosetting takes place. Generally, the resin or resin mixture constitutes about 80 to about 97 percent by weight of the toner with the balance being essentially pigment. Aside from its position in the triboelectric series and other basic, electrostatically oriented criteria, resin employed in toners for development of electrostatic images must have a relatively low melting range or, alternatively, be adaptable to be made tacky by exposure to solvent vapors. Generally speaking, when toner in image form is heat fused onto a receiving surface, the melting range of the resin or resin mixture employed in the toner must be in the range of about 85° to about 110° C. When solvent vapor fixing is employed, the resin must be specifically adapted to be tackified by the particular solvent vapor used in the machine system.

Pigments which can be employed in the process of the present invention usually are selected from the class of very fine particle sized carbon blacks. Considering that a toner particle has an average dimension of about 5 to 15 microns, it is usually necessary to employ pigments having an ultimate particle size considerably smaller than 5 microns. Channel, oil furnace and gas furnace blacks having ultimate particle diameters of about 20 to about 80 millimicrons are very suitable. As is well known to those skilled in the art, carbon black pigmented toners can contain small amounts of dyes or pigments of colors other than black to provide delicate variations in subtones. Occasionally it is desired to provide toners of colors other than black. On these occasions pigments such as titania, phthalocyanine blue, pigment reds, pigmentary azo yellows and the like can be used in place of carbon black. When organic pigments are used, it is important to select very finely divided pigments which are stable to the degree of heat involved in toner manufacture. Within these limits almost any pigment can be used. Those skilled in the art will recognize, of course, that some pigments are easier to disperse in nonpolar media than others. Accordingly, in selecting suitable pigments, ease of dispersion in molten resin is another practical criterion to be observed.

The step of causing a gaseous dispersion to exist in a molten (including highly plastic) thermoplastic resinous mass in most readily carried out by using as a source of thermoplastic resin, expandable or partially preexpanded thermoplastic beads such as those described in U.S. Pat. Nos. 2,779,062; 2,744,291 and 2,787,809 assigned to Badische Anilin- & Soda-Fabrik A. G. Briefly, the beads described in these patents consist of thermoplastic polymer and associated, nonsolvating low-boiling point liquids such as pentane or ligroin (petroleum ether). As an example, monomer such as styrene is pearl polymerized in the presence of about 10 percent by weight ligroin at a temperature below the boiling point of the ligroin. The resultant pearls of polymer containing the ligroin as associated liquid (because polystyrene is not soluble in the ligroin) can be expanded by heating them at a temperature above the boiling point of the ligroin. From this statement it will be appreciated that the gas of the gaseous dispersion in molten or highly plastic resin can be the vapor of a material liquid at ordinary room temperature as well as air and other substances more conventionally considered to be gases. Fully expanded and partially expanded polystyrene beads are sold commercially, for example, by Foster Grant Co., Inc. For purposes of this invention, it is advantageous that the resin to be manufactured into toner be comprised, at least in part, of partially expanded polystyrene beads of the character described above.

Those skilled in the art will appreciate that while the use of partially preexpanded polystyrene beads in the process of the present invention is advantageous both from an economic and electrostatic viewpoint, other methods of producing a molten resin containing a gaseous dispersion can be employed. For example, a heat activatable blowing agent such as one selected from the group in table I can be used either alone or with a promoter as a source of dispersed gas.

TABLE I

| | |
|---|---|
| $Al_2O_3 \cdot CO_2$ | N,N'-dinitroso N,N-dimethyl sebacamine |
| $NaHCO_3$ | p-carbomethoxy benzazide |
| | $\alpha,\alpha'$ azobis isobutylnitrile |
| p,p' oxybisbenzenesulfonyl-hydrazide | Acid activated dinitroso-pentamethylene tetramine |
| N,N dimethyl N,N' dinitrosoterephthalamide | Ethylene bis-nitroso benzamide |
| Dinitrosopentamethylene-tetramine p(t butyl) benzazide | N,N'-dinitroso N,N' dimethyl4,4'dibenzamide |
| N,N'-dinitroso, N,N'-dimethyl succinamide | Axodicarbonamide |

Alternatively, air, nitrogen, carbon dioxide, or other gas can be whipped into molten or highly plastic resin to provide the proper gaseous dispersion. Advantageously, the gas phase comprises about 50 to about 75 percent of the volume of the gas-resin system in the first step of the process of the present invention.

In carrying out the process of the present invention, Foster Grant Expandable Polystyrene Beads are melted and, if desired, blended with other compatible resins under high shear in a high shear mixer or on a two-roller mill. Melting causes expansion of the Foster Grant Expandable Beads to provide the required molten resin, dispersed gas system. Pigment, usually carbon black, is then added and thoroughly ground into the molten resin matrix while the temperature is maintained so as to retain the mix in a molten or highly plastic state. The result at this point after cooling is highly friable, thoroughly pigmented expanded polystyrene-base, thermoplastic resinous mass. The mass is then ground in a conventional air attrition mill to provide toner particles having an average major dimension of about 10 to 15 microns. If different brands or types of resins are used, those skilled in the art will appreciate that the blowing agent can be contained in commercially available resin forms or can be added to specially prepared resin. When adding blowing agent to resins, care must be taken to disperse or dissolve the blowing agent reasonably uniformly in the resin before raising the temperature sufficiently high to activate the blowing agent. The blowing agent appears to serve a number of different functions. During pigmentation of the resin in the preparation of the toner of the invention, the blowing agent assists in dispersing the pigment and thus helps to provide an intensely pigmented toner. In addition, the highly friable, cool, expanded pigmented resin is an ideal material to be ground by air attrition to ultimate toner particle size.

In order that those skilled in the art will have a greater appreciation of the advantages of the present invention, the following examples are given:

EXAMPLE I

A toner is made by melting and simultaneously expanding 90 parts-by-weight of Expandable Polystyrene Beads-type 1375 (sold by Foster Grant Co. Inc.) and mixing therewith 10 parts-by-weight of carbon black. The mixture is then sheared for approximately 30 minutes on a two-roll mill. The thus produced system of pigment, dispersed in resin, is cooled and broken into small, easily friable pieces of chips. The chips are then reduced by air attrition in an air jet or thrust-type attritor to an average particle size within the range of 10 to 15 microns.

EXAMPLE II

A toner is made in the same manner as the toner described in Example I with essentially the same concentration of pigment and resin. The resin, however, comprises a mixture of 30 parts-by-weight of Expandable Polystyrene Beads and 60 parts-by-weight of a low-molecular weight polystyrene plasticized styrene-acrylonitrile polymer containing about 30 percent of acrylonitrile. The thus resulting toner is molten at about 95° to 102° C. and can be used as a positively charged or negatively charged toner.

ADDITIONAL EXAMPLES OF TONERS

Table II contains details of other toner formulations which are made essentially by the process of the present invention as set forth in Example I.

TABLE II

| Example No. | Resin, type | Percent | Pigment, type | Percent | Blowing agent, type | Percent |
|---|---|---|---|---|---|---|
| 3 | Styrene-methacrylate copolymer ≈70% styrene. | 89 | Carbon black | 9 | Celogen* | 2 |
| 4 | Polystyrene / Polybutylmethacrylate | 60 / 28 | Carbon black | 10 | Celogen* | 2 |
| 5 | Foster Grant expandable polystyrene beads-type 1375. | 87 | Cu phthalocyanine | 13 | (In polystyrene beads) | |
| 6 | Polyvinyl toluene | 86 | Carbon black | 11 | Celogen* | 3 |
| 7 | Polyvinyl toluene / Polybutylmethacrylate | 60 / 25 | Azo yellow pigment | 12 | Celogen* | 3 |

*Trade name for p, p' oxybis(benzenesulfonylhydrazide).

EXAMPLE VIII

The toner of Example II was tested in a Xerox model 3600 III copying machine made by Xerox Corporation and the results of such use were compared under standardized, identical conditions with the results using a toner made, distributed and sold for use in said machine by Xerox Corporation. Not only did the toner of Example II produce copies having better image density, better edge contrast, cleaner backgrounds, better halftone character than copies produced with the toner made by Xerox Corporation but also a standard weight of the toner of Example II produced 9070 copies whereas the same quantity of toner made by Xerox Corporation produced only 6830 copies of the identical original. The Xerox 3600 III copying machine employs a toner charged negatively by friction with cascade carrier beads to develop positively charged images. The toner of Example II is also capable of triboelectrically interacting with iron fillings to attain a positive charge and thus is suitable for developing negatively charged images on Electrofax-type surfaces.

While the present invention has been described in conjunction with advantageous embodiments, those skilled in the art will recognize that modifications and variations may be resorted to without departing from the spirit and scope of the invention. Such modifications and variations are considered to be within the purview and scope of the invention.

I claim:
1. A process for the production of solid toners adapted to develop electrostatic images comprising dispersing a gas in a heated resin maintained in at least a highly plastic condition, milling pigment into said heated resin while said resin contains said gas in dispersion therein, cooling the thus pigmented resin and, thereafter, comminuting the cooled pigmented resin to an average particle size of about 10 to about 15 microns.

2. A process as in claim 1 wherein the amount of pigment milled into the heated resin is about 3 to about 20 percent by weight based on the total pigment plus resin.

3. A process as in claim 1 wherein the gas is a vapor of a low-boiling point organic liquid associated with said resin.

4. A process as in claim 1 wherein said pigment is finely divided carbon black.

5. A process as in claim 2 wherein the heated resin contains molten polystyrene foam and the pigment is carbon black.

* * * * *